United States Patent [19]

Yamane

[11] 4,371,219

[45] Feb. 1, 1983

[54] FLOATING BUSH AND OUTER BEARING STRUCTURE FOR MOUNTING A SHAFT IN A BODY ROTATABLY

[75] Inventor: Ken Yamane, Yokohama, Japan

[73] Assignee: Nissan Motor Company, Ltd., Yokohama, Japan

[21] Appl. No.: 231,017

[22] Filed: Feb. 3, 1981

Related U.S. Application Data

[63] Continuation of Ser. No. 72,899, Sep. 6, 1979, abandoned.

[30] Foreign Application Priority Data

Nov. 14, 1978 [JP] Japan .................. 53-140248

[51] Int. Cl.³ .............................................. F16C 33/66
[52] U.S. Cl. .............................. 384/291; 308/DIG. 4
[58] Field of Search ................... 308/28, 78, 106, 107, 308/108, 121, 122, 123, 124, 237 R, 237 A, 240, DIG. 4

[56] References Cited

U.S. PATENT DOCUMENTS 3,058,787 10/1962 Bernson ........................... 308/121

FOREIGN PATENT DOCUMENTS 2026303 1/1971 Fed. Rep. of Germany .

Primary Examiner—Frederick R. Schmidt
Attorney, Agent, or Firm—Thompson, Birch, Gauthier & Samuels

[57] ABSTRACT

A bearing structure for supporting a shaft in a body is disclosed in which a floating bush is fitted over the shaft and the bush is supported in a cylindrical bearing which is fitted fixedly in the body. Lubricant is supplied to the outside of the cylindrical bearing to a clearance between it and the body, and flows through passages in the bearing to a clearance between the bearing and the bush, where it flows through passages in the bush to the clearance between the bush and the shaft. The passages in the bush are radial, whereas the passages in the bearing are preferably inclined at about 45° to the radii, and extend outward in the opposite direction to the normal direction of rotation of the shaft. The number n of passages in the bush is larger than the number m of passages in the bearing; both of these numbers are even; and the angle subtended at the central axis of the shaft by the opening at the inner end of the passages in the bearing is approximately 360°/m–360°/n.

4 Claims, 6 Drawing Figures

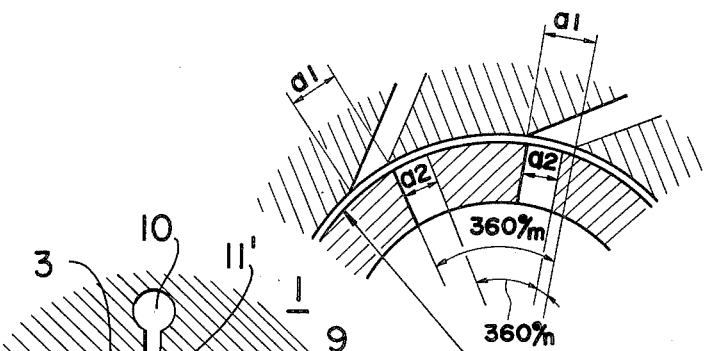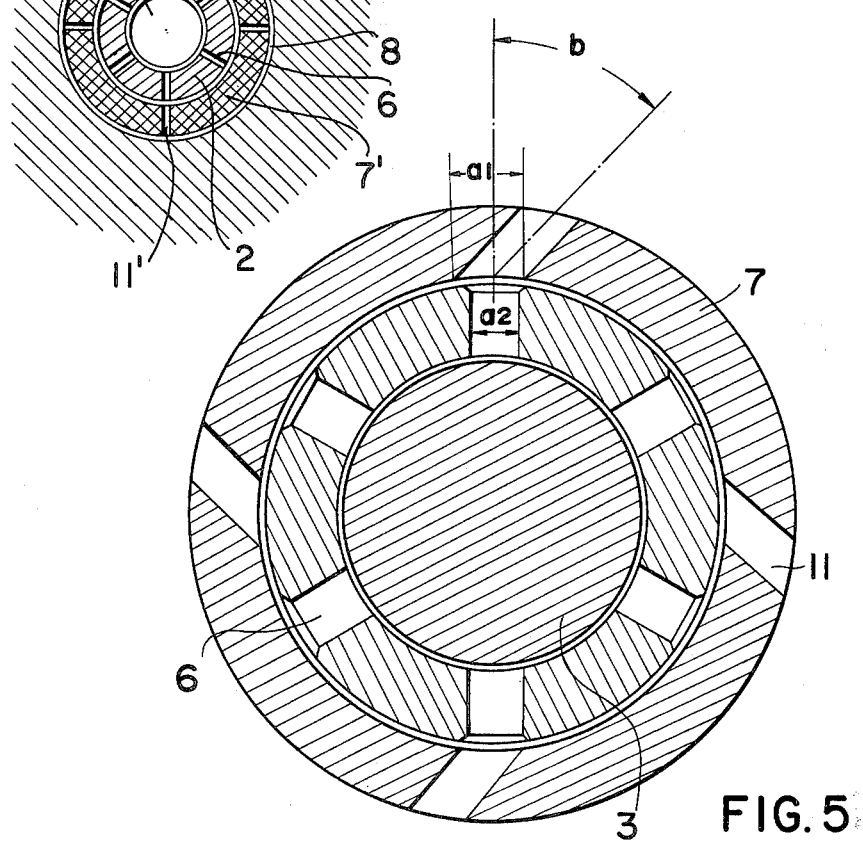

FLOATING BUSH AND OUTER BEARING STRUCTURE FOR MOUNTING A SHAFT IN A BODY ROTATABLY

This is a continuation of application Ser. No. 72,899, filed Sept. 6, 1979 now abandoned.

BACKGROUND OF THE INVENTION

This invention relates to a bearing structure for supporting a shaft in a body, and more particularly relates to a structure which comprises a floating bush as a shaft support means.

FIG. 1 of the drawings shows a typical prior art bearing structure. In the body 1 is received a floating bush 2, and in the floating bush 2 is rotatably supported a shaft 3. Lubricant is fed from a passage 4 in the body 1 to a lubricant recess 5 which opposes part of the periphery of the bush 2, and thence is supplied to the small clearance which exists between the bush 2 and the body 1. From this clearance the lubricant passes through a plurality of equally spaced passages 6 which are bored radially through the bush, and is introduced to the annular space between the bush 2 and the shaft 3, so as to lubricate the bearing.

Since this structure has an asymmetrically positioned lubricant recess 5, a uniform feed of lubricant around the outer circumference of the bush 2 cannot be provided. Further, when the pressure of the lubricant is increased, the bush is urged in a particular direction relative to the body, and its rotation is hindered. Further, the asymmetrical supply of lubricant through the passages 6 urges the shaft 3 in a particular direction. If the pressure of the supply of lubricant pulsates, such as the pressure of a lubricant supply directly from a slowly rotating oil pump, this pulsation is imparted to the shaft, and a problem of insufficient lubrication may occur.

SUMMARY OF THE INVENTION

Therefore, it is an object of this invention to provide a bearing structure which eliminates the problems described above.

According to the present invention, this object is accomplished by a bearing structure which supports a rotating shaft in a body formed with a lubricant-conducting passageway. A floating hollow-cylindrical bush is supported loosely on the shaft with a clearance existing therebetween. A hollow-cylindrical bearing is held in the body with another clearance existing between the bearing and body, which other clearance communicates with the body's lubricant-conducting passageway so as to receive lubricant therefrom. The bearing loosely supports the bush with still another clearance existing therebetween.

The bush is free in use to turn with respect to the bearing and shaft. The bush is formed with an even number n of circumferentially equally spaced passages extending radially from its outer cylindrical surface to its inner cylindrical surface. The bearing is formed with a lesser even number m of circumferentially equally spaced passages which extend from its outer cylindrical surface to its inner cylindrical surface and which are inclined with respect to the bearing radii in the direction opposite to the normal direction of shaft rotation, thus providing an arrangement whereby the passages of the bush come into register sequentially with the passages of the bearing as the bush rotates relative to the bearing. The radial angle subtended by the inner ends of the passages in the bearing are approximately $360°/m - 360°/n$.

BRIEF DESCRIPTION OF THE DRAWINGS

The present invention will become more fully understood from the following description of several preferred embodiments thereof, and from the accompanying drawings. However, the description of the embodiments, and the drawings, are given for the purposes of explanation and clarification only, and are not intended to be taken as limiting in any way the present invention, whose scope is to be defined solely by the claims. In the drawings.

FIG. 4 is a schematic illustration explaining the principles governing the sizes of the various parts of the bearing structure of the present invention;

FIG. 5 is a view similar to FIG. 2, showing in more detail an embodiment of the bearing structure of the present invention; and FIG. 6 is a transverse cross-sectional view of a modification of the bearing structure shown in FIG. 2 wherein the bearing 7' is provided with a plurality of radial lubricant passages 11'. The structure of FIG. 6 operates in a manner similar to that of the structure of FIG. 2.

DETAILED DESCRIPTION OF THE PREFERRED EMBODIMENTS

Figure 1:
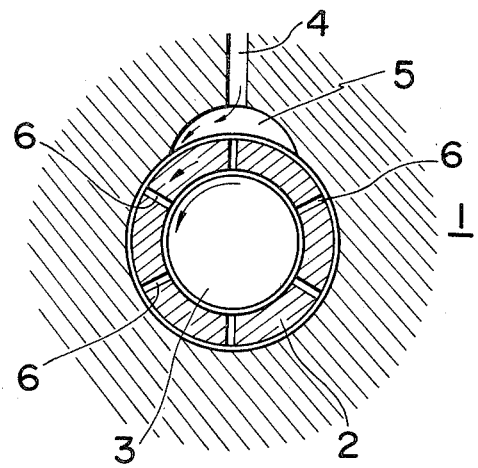
FIG. 1 is a transverse cross-sectional view of a prior art bearing structure.
Figure 2:
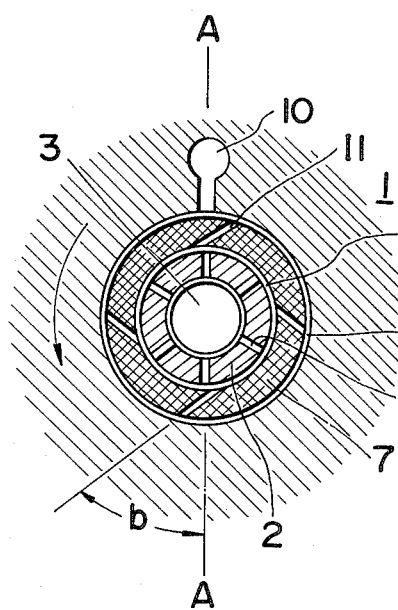
FIG. 2 is a transverse cross-sectional view of a bearing structure according to the present invention, taken along the line B—B in FIG. 3.
Figure 3:
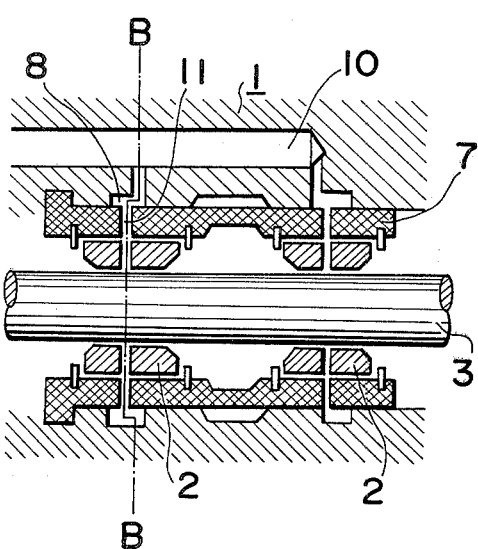
FIG. 3 is a view taken along the line A—A in FIG. 2.

Referring to FIGS. 2 and 3, there is shown a bearing structure according to the present invention. A body 1 has a hollow cylindrical bearing 7 fixedly mounted in it with a clearance 8 being left therebetween. This bearing has a floating bush 2 loosely disposed therein with a clearance 9 being left therebetween, and the bush 2 supports a shaft 3 rotatably with a clearance being left therebetween, as in the prior art bearing of FIG. 1.

Lubricant is fed from a passage 10 in the body 1 to the annular clearance 8 between the bearing 7 and the body 1. The bearing 7 is drilled with an even number of circumferentially equally spaced passages 11, which communicate and conduct lubricant from its outer circumferential surface to its inner circumferential surface. In the shown embodiment, there are four of these passages 11, and they are inclined at an angle of approximately 45° to the radii of the bearing 7.

Thus the lubricant is conducted into the clearance between the bearing 7 and the bush 2. From this clearance it is conducted through passages 6 which are bored radially through the bush 2. According to the present invention, there are an even number of these passages 6, and this number is greater than the number of passages 11. In the shown embodiment there are six of these passages 6. Thus, lubricant supply to the clearance between the bush 2 and the shaft 3 is performed.

In FIG. 4 the principles governing the size of the inner openings of the passages in the bearing are illustrated. In the bearing which is partly shown there are provided m passages in the bearing and a larger number n of passages in the bush. Both m and n are even; this is according to a particular characteristic of the present invention, so that whenever a lubricant passage is opened up on one side of the shaft by a passage in the bush and a passage in the bearing coming into register, substantially at the same time the corresponding passages on the other side of the shaft also come into register, and thereby the new supply of lubricant does not cause a sudden disturbing shock to the shaft and cause it to be displaced in a direction perpendicular to its axis. Further, according to another particular aspect of the present invention, the number n of passages in the bush is larger than the number m of passages in the bearing; this is so that every passage in the bearing may be at all times, if not venting to a passage in the bush, on the verge of doing so. It is purposely arranged that the number of passages in the bush and the number of passages in the bearing differs, so that the passages should not all become out of register at once.

Further, it is desired that, when the opening from one passage in the bearing to one passage in the bush is just beginning to be closed—this is the right hand pair of passages in FIG. 4, and the bush is rotating counter-clockwise relative to the bearing in this diagram—the opening from the next passage in the bearing to the next passage in the bush should at least be starting to open—this is the left hand pair of passages in FIG. 4. This condition is for the purpose of maintaining a steady and welldistributed supply of lubricant.

In FIG. 4, the angle subtended at the axis of the shaft by the inner parts of the passages in the bearing is denoted by a1, and the angle subtended by the passages in the bush is denoted by a2. The angles between the trailing edges of successive ones of these passages are of course, respectively, 360°/m and 360°/n. It will be seen from the figure that, considering the angular size of the right hand passage in the bearing:

$$a1 = a2 + (360°/m - a2 - 360°/n) = 360°/m - 360°/n$$

The present invention takes this for the size of the inner openings of the passages in the bearing, approximately, in view of the fact that, consistent with the above-described condition, it is desirable to keep these passages as small as possible, so as to maintain structural strength.

It is shown in the figure, but is not essential, that the circumferential width of the bush passages 6 should be smaller than the circumferential width of the opening of the bearing passages 11. Also it is desirable, although not essential, to incline the angle b of the passages in the bearing by about 45° to the radii, in order to obtain a wedge effect which will help in the supply of lubricant. For this, it is desirable that the passages should extend outwards in the direction opposite to the normal direction of rotation of the shaft 3 (counter-clockwise in the figures).

FIG. 5 shows a first example of this bearing structure, wherein m is 4 and n is 6. Thus the angle subtended by the inner ends of the passages through the bearing is 30°.

Another possibility would be to have m as 6 and n as 8. Then the angle subtended by the inner ends of the passages through the bearing is 15°.

Although the invention has been shown and described with reference to some particular embodiments thereof, it should be understood that various alterations and modifications of the form of any particular embodiment may be made by one skilled in the art, without departing from the scope of the invention. Therefore, it is desired that the said scope of the invention should be determined, not by any fortuitous details of the purely illustrative embodiments and drawings, but solely by the accompanying claims, which follow.

I claim:

1. A bearing structure which supports a rotating shaft in a body, said body being formed with a lubricant-conducting passage which supplies lubricant comprising:

a floating hollow-cylindrical bush supported loosely on the shaft with a clearance existing therebetween; and a hollow-cylindrical bearing held in the body with a clearance existing therebetween, said clearance between said body and said bearing communicating with said lubricant-conducting passage so as to receive lubricant therefrom, said bearing loosely supporting the bush with a clearance existing therebetween;

the bush being free in use to turn with respect to the bearing and the shaft;

the bush being formed with an even number n of circumferentially equally spaced passages extending radially from its outer cylindrical surface to its inner cylindrical surface, the bearing being formed with a lesser even number m of circumferentially equally spaced passages which extend from its outer cylindrical surface to its inner cylindrical surface and which are inclined with respect to the bearing radii in the direction opposite to the normal direction of rotation of the shaft, whereby the passages of the bush are arranged to come into register sequentially with the passages of the bearing as the bush rotates relative to the bearing, the radial angle subtended by the inner ends of the passages in the bearing being approximately 360°/m−360°/n.

2. A bearing structure according to claim 1, wherein m is 4 and n is 6.

3. A bearing structure according to claim 1, wherein m is 6 and n is 8.

4. A bearing structure according to any of claims 1 or 3, wherein the passages in the bearing are inclined at an angle of substantially 45° to the bearing radii.

* * * * *